Figure 1:
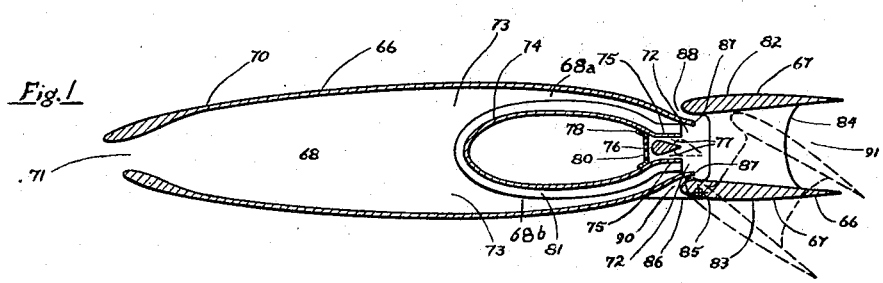

May 5, 1959  R. W. GRISWOLD II  2,885,162
INTEGRATED JET-WING

Filed Feb. 8, 1956  2 Sheets-Sheet 1

Inventor
Roger W. Griswold II
By Frank H. Borden
Attorney

May 5, 1959
R. W. GRISWOLD II
2,885,162
INTEGRATED JET-WING
Filed Feb. 8, 1956
2 Sheets-Sheet 2
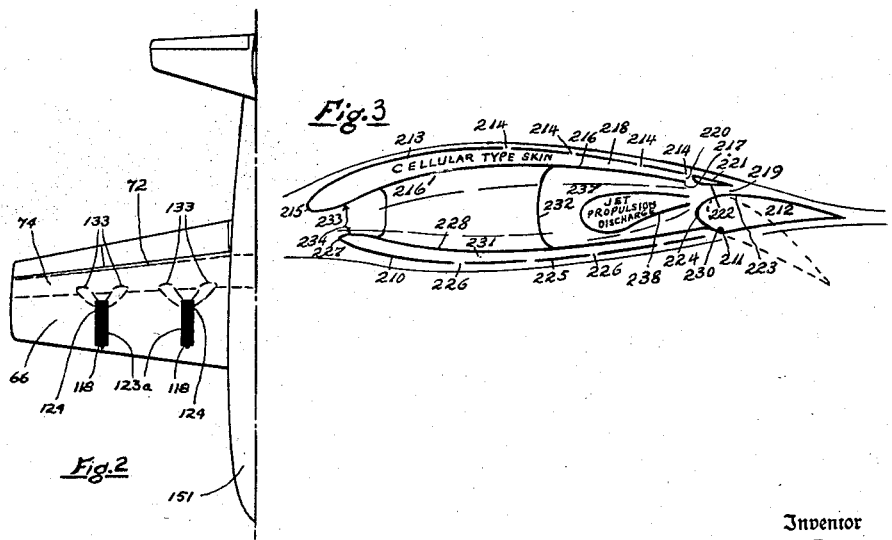
Inventor
Roger W. Griswold II
By Frank H. Borden
Attorney

United States Patent Office 2,885,162
Patented May 5, 1959

2,885,162

INTEGRATED JET-WING

Roger W. Griswold II, Old Lyme, Conn., assignor to Elizabeth M. Griswold, doing business as Griswold Company, Old Lyme, Conn.

Application February 8, 1956, Serial No. 564,201

6 Claims. (Cl. 244—42)

This invention relates to jet aircraft of the fixed-wing type and is particularly concerned with functional integration of the power-propulsive-aerodynamic systems thereof, so as to provide direct lift, augmented thrust and reduced drag effects in a self-propulsive integrated jet-wing system.

Essentially the instant invention, designated the integrated jet-wing, comprises the following concept: Fixed-wing jet aircraft characterized by a functionally integrated power-propulsion-aerodynamic system wherein the primary power is directly utilized to progressively induce a quantitatively increasing unified mass flow, comprising the initially generated combustion flow and successively the propulsive and the wing circulatory flow systems, whereby the momentum of such mass flow is substantially augmented to provide maximum static lift and residual thrust effects, if any, for take-off and landing with such functions progressively transposed as the speed increases to provide the alternative extreme of minimal direct-lift effects and optimum balance of augmented thrust with concurrent drag reduction in the high speed range.

It is among the objects of this invention to provide jet thrust augmentation, effective throughout a relatively wide speed range; to provide jet-induced forced circulation over the wing and other aerodynamic surfaces which will be productive of direct-lift including jet-reaction effects; to provide increased laminar stability in the boundary layer flows over the aerodynamic surfaces in the high speed range, in particular, and substantial removal of the turbulent boundary layer flows adjacent to such surfaces, if such latter type flow exists; to provide the foregoing triumverate functions, i.e. augmented thrust, increased lift, and reduced drag, including selective combinations thereof, by means of an essentially unified flow system energized by a common jet power plant system, whereby the kinetic, thermal and mechanical energy potential therefrom is applied in various predetermined combinations to the stated functions in integrated selective balance to attain the optimum aerodynamic performance at particular operating speeds; to provide an effective reduction of induced drag relative to true airspeed in the low speed range, thereby permitting, among other advantages, use of lower aspect ratio wings; to provide decreased specific fuel consumption; to provide increased wing thickness ratios for any given critical Mach speed and minimum drag criteria; to provide reduced air-frame structural weight; to provide a greater payload-range-speed utility factor in jet aircraft characterized by a wider practical selection of useful operating speeds and altitudes, in combination with greatly improved take-off, path-angle-of-climb and landing performance; to provide increased maneuverability, particularly for heavily loaded aircraft; to provide more effective control surfaces due to forced circulation effects and maintenance of essentially potential flow thereover, thus reducing both control surface size and the operating forces required for a given effectiveness; to provide inherently greater stability due to separation flow control; to provide (substantial) anti-icing control irrespective of operating speeds; to provide reduced jet efflux noise level due to reduced temperature and velocity of the propellant slipstream; to provide jet aircraft capable of effectively utilizing an extended range of the available combustion-propulsive heat cycle, i.e. wherein the efflux temperatures of the propulsive system are substantially reduced; to provide means whereby the higher heats associated with future gas turbine and other jet engine developments can be used to full propulsive and aerodynamic advantage, as well as for improved thermal efficiency of the engine; to provide enhanced operational safety for jet aircraft, by reducing minimum flight speeds well below the otherwise attainable aerodynamic limits for a given wing loading, thus providing potentially lower crash impact velocities, in the event of complete power failure near the ground, than those obtaining at the power-off stalling speeds; to provide heated external local flows over the aerodynamic surfaces for effective reduction of operating Reynolds numbers below the attainable laminar stability scale effect transition limits, where applicable; to minimize or eliminate jet propulsive efflux luminosity; and to provide other objects and advantages as will become more apparent as the description proceeds.

In the accompanying drawings:

Fig. 1 schematically depicts the essential aerodynamic and propulsive features in chordwise and sectional view of a trailing edge discontinuous type of jet powered direct-lift airfoil primarily comprising a low-drag high-thrust form of the invention, with the low drag disposition of the combination shown in solid lines and the high-lift position thereof by dotted lines.

Fig. 2 schematically depicts a certain type of airframe configuration incorporating a powerplant and airfoil combination generally similar to that of Fig. 1, which indicates a preferred complete airplane design arrangement of the invention.

Fig. 3 represents a diagrammatic chordwise section through an airfoil according to one form of the invention, utilizing a cellular type of skin in conjunction with external boundary layer control (BLC) suction bleeder slots and an internal duct for mixing flight induced flow with jet propulsion augmentation means communicating with both the bleeder slots and the internal duct and including a lift-increasing flap juxtaposed relative to the jet means.

Before discussing the individual figures it is pertinent to mention certain advantages of the suction slot BLC principle. These chiefly comprise its ability to delay the onslaught of flow separation over the airfoil surfaces, to increase the stability of the laminar boundary layer in regions of incipient transition, thus delaying or avoiding transition thereof altogether, and to remove the turbulent boundary layer flows therefrom, thus maintaining very low values of wake drag throughout its effective operating range. Other than for the practical matters concerning the induced drag with particular airplane configurations and the power required to energize the system, then, the suction slot by maintaining essentially potential flow will provide exceptionally favorable lift-drag ratios substantially throughout the speed range attainable therewith, including the region of large lift coefficients such as will substantially improve the take-off, climb, high speed maneuverability, slow speed flight and landing characteristics. In addition, the suction slot, by the very nature of the fluid mechanics involved, is better suited than the pressure jet, to maintain laminar stability in the external local boundary layers due to virtual elimination of viscosity effects and consequent avoidance of incipient transition to the turbulent state, as has been demonstrated experimentally under precisely controlled ideal conditions.

For the high speed version of such a system, to provide either substantial laminar flow or partial control thereof with concurrent removal of the turbulent boundary layers following transition, if the latter can not be avoided, the usual proposed arrangement is to dispose a single or multiple series of suction slots or narrow slits in both upper and lower surfaces of the wing, as well as alternatively, or additionally, at judicious locations along the fuselage and tail surfaces, as may be required in the circumstances. It will be understood that the problem of low-drag BLC becomes more difficult as the operating Reynolds number is increased, since the natural laminar transition point on the airfoil moves forward in that case. For that reason, plus the higher velocities and/or greater surface contact with the local flow associated with increased dynamic scale effects, there is a larger quantity of de-energized boundary layers to remove. However, in any case, the pumping power per se required therefor is so extremely small as to be negligible, provided the ideal means can be approximated in practice. In this connection, encouraging results continue to be achieved experimentally with the use of area suction, i.e. permeable porous surfaces disposed wherever it is desired to withdraw local boundary layer flows. Sintered bronze and various types of extremely fine mesh screens giving a seepage inflow velocity of about 4 f.p.s., more or less, have been used for this purpose. The exceptionally low pressure head and minimal inflow-loss with such BLC elements make the area suction idea appear very attractive indeed.

In contrast to the particular effectiveness of the suction slot for BLC, it has been demonstrated by wind tunnel experiments that a pressure blowing jet properly conjoined with an airfoil, is very effective in directly inducing circulation control (CC) thereover, i.e. providing direct lift independent of incidence of the free stream flow. This invention accordingly combines or integrates various suction and blowing powered airfoil configurations to respectively provide BLC and CC effects therefor.

The Fig. 1 design is particularly directed to thrust augmentation and low-drag effects, concurrently with substantial power-induced circulation control potentialities. The high speed ducted-airfoil combination 66—66 comprising the fixed airfoil section 70 and the movable venturi type double flap 67—67 is shown in solid lines with the low speed deflection of the double flap 67—67 shown by dotted lines. The aerodynamic and propulsive elements of Fig. 1 are essentially spanwise in extent.

Internal pressure chamber 68 defined by the relatively fixed airfoil section 70 communicates with entrance throat 71 and secondary jets 72—72, having fixed openings designed for particular operating requirements, but in any case, of such respective area ratios that greater than atmospheric static pressure will build up within chamber 68 due to flight-induced ram. Throat 71, chamber 68, and secondary jets 72—72 together form chordwise airfoil passages 73 extending internally of fixed airfoil section 70.

Curvilinear primary duct 74, of greater width than depth is disposed within the after part of chamber 68, and has substantially parallel and straight spaced trailing edge surfaces 75—75 forming the inner surfaces of the secondary jets 72—72, with the outer surfaces thereof being respectively comprised of trailing edge surfaces 87—87 of fixed section 70. Metering wedge 76 is disposed between duct surfaces 75 and spaced therefrom to form substantially co-equal primary jets 77—77. The shape of primary duct 74 is retained by tension strip 78 having multiple spanwise perforations 80, and by multiple heat transfer fins 81 substantially aligned with the internal airflow. Duct 74 has relatively large volumetric capacity for transporting the gas-dynamic efflux flow from the jet engine (not shown) under conditions of relatively high pressure and low velocity to minimize the internal losses of the system. Metering wedge 76 is movable in translation (and angularly additionally, if desired, as shown by Fig. 1) by suitable prior art mechanical means, from the rearwardly disposed low speed nozzle-shaped discharge jets of the dotted line position thereof, to the forwardly disposed high speed diffuser-shaped discharge jets of the solid line position thereof, as related to complemental duct surfaces 75 in both cases.

Double flap 67 comprised of upper flap section 82 and lower flap section 83, respectively carried by and held in relatively fixed position by connecting struts 84, is asymmetrically pivotally mounted as a unit at 85 on bracket 86 extending from fixed airfoil section 70. Trailing edges 87 of airfoil section 70 extend within the entry of internal jet efflux passage 91, but are spaced from sections 82 and 83 and together therewith form upper and lower surface injector slots 88 and 90, respectively, for the flap neutral position. When flap 67—67 is deflected to the lift-increasing dotted line position, the injector opening of slot 88 is greatly increased, while slot 90 is substantially closed. Flap passage 91 may comprise a full or partial venturi shape, or have a nozzle type exit, depending upon the propulsive design requirements in particular cases. Further, flap sections 82 and 83 may be individually pivoted for operating cooperatively or in mutual opposition, as may be required for various other functions, such as control surfaces, dive brakes, thrust arresters, or for multi-function combinations of the foregoing uses. Such a discontinuous type of self-propulsive airfoil system offers important advantages for tailless designs, in that the control surface elements thereof would operate under forced flow conditions, power-on, and with aerodynamically augmented flow, power-off.

It will be noted that with injector slots 88 and 90 operative in the low-drag, substantially symmetrical disposition thereof, the low momentum external local boundary layers are directly sucked into efflux passage 91 and almost immediately thereafter ejected at considerably better than freestream velocity, with minimal change in mean flow path, such that the terminal boundary layers over the external surfaces of flap sections 82 and 83 are likewise accelerated. Thus, extremely simplified and economical means to increase laminar stability and to remove the turbulent boundary layers, if the latter be still existent, with consequent substantial improvement of the high speed aerodynamic efficiency, are provided integrally with the propulsive function, sans all the diffuser type bleeder slots, internal ducts, secondary power converters and associated primary power source of the prior art functionally segregated types of low-drag BLC systems.

The Fig. 1 configuration provides the novel arrangement whereby pressure jet 72 directly energizes the suction slots 88 and 90, for boundary layer induction in the high speed range, and via slot 88, for substantial upper surface local flow induced circulation effects at low speeds.

As to the high speed propulsive function of ducted-air-foil passage 73 in operative association with jet efflux passage 91, it has been conclusively established by the prior art, in connection with various limited applications, that properly designed internal flow systems, productive of substantial ram pressure and thus low internal velocities, do not increase the airplane drag. Further, that with the addition of heat in the expanded section of the duct under these relatively high pressure conditions, the momentum of the flow in the wake will be increased by the conversion of thermal to kinetic energy. Present results indicate that the ideal thermal efficiency can be closely approached if the heat transfer losses can be kept low. Such a system may become of comparable propulsive efficiency to the engine-propeller combination or the turbojet at Mach numbers approaching 1.0 (Mach number being the ratio of the airplane speed relative to the speed of sound).

A spanwise ducted-type wing, comprised of such an organization as the Fig. 1 airfoil section and the Fig. 2 configuration to be described, can therefore be used to ram-inject the secondary mass flow to the propulsive system at high speeds, without dependence upon ejector action and without requiring additional power for such pumping action.

If the heat rejected by the engine and accordingly present in the efflux flow therefrom can then be transferred to the greater mass made available by the ducted wing, efficiently, i.e. as by heat transfer largely prior to mixing at relatively high velocity the primary and secondary flows, for instance, the thrust will accordingly be augmented. In that event, the mass-compounded, self-propulsive airfoil system will be more efficient than the simple turbojet propulsive system, as indicated by the reduced efflux temperature and velocity but greater momentum of the former (after accounting for heat transfer losses) consequent from propulsively effective utilization of an extended useful heat cycle range.

It will be observed that the external contour of duct 74, in its relation to the adjacent internal surfaces of duct 68 in airfoil 66 defines upper and lower rearwardly tapering flow passages 68a and 68b, terminating at their narrowest portion in the secondary jets 72—72, thus converting ram pressure to velocity thereat. With the heat transfer fins 81 of the duct 74 arrangement of Fig. 1, the ideal heat transfer efficiency will be closely approximated. Further, the residual thermal energy differential between primary and secondary flows will be minimized, with consequent increase in velocity of the secondary flow due to heating thereof, thus reducing the stream mixing losses, upon confluence thereof at secondary jet 72. The fore and aft adjustable metering wedge 76, cooperates in this reduction of stream mixing losses, by contributing to minimal kinetic energy differentials when primary jets 77—77 discharge at relatively low velocity via their diffuser (solid line) efflux passages for the high speed flight range, in complemental relation to the acceleration of the secondary flow due to duct shape and prior heat transfer up to discharge thereof at jet 72. But when metering wedge 76 is rearwardly disposed (dotted lines) to comprise the nozzle configuration productive of relatively high velocity discharge of primary jets 77—77, for the static and low speed range, the augmentation system will obviously operate as an ejector with maximal kinetic energy differentials relative to the secondary flow. However, metering wedge 76 may be positioned intermediately of its nozzle and full-diffuser extremes, and, of course, even at high speeds there will still be some residual, but relatively less consequential, ejector action. In other words, thrust augmentation will be effected throughout the speed range, primarily by interchange of thermal energy to the flight-pressurized secondary propulsive flow at the higher speeds, and increasingly by kinetic energy, induction and ejection thereof as the speed is reduced.

The Fig. 1 design, as a typical example of many alternative detail versions of the basic principles of the invention, accordingly provides, for the first time, practical means to overcome the high speed limitations of the prior art ejector systems—either as concerns ejectors, per se, or ejectors in combination with airfoils or other aerodynamic bodies. It will be noted that in this new concept, an important feature is that the wing becomes an essential element of the propulsive system by serving as the secondary compressor therefor in the high speed range, in functionally harmonious integration with its aerodynamic requirements, particularly with respect to BLC drag reduction coincident to thrust augmentation.

It is of interest to point out that integrated jet-wings of increased thickness ratios could be expected to provide higher propulsive efficiency, as well as increased direct-lift effects. For relatively low subsonic speed aircraft, this increase in wing thickness ratio might amount to more than 50%, but for substantially higher design operating speeds, such increase would be appreciably less, compared to present jet aircraft types in both cases. Since the important thing is the over-all efficiency and performance of the airplane, as distinguished from isolated engine, propulsion or aerodynamic characteristics, per se, it will be clear that with this invention it will generally be beneficial to use thicker wings than those of current jet aircraft practice, with consequent structural economy. This constructive reversal of modern closed-profile-wing design trends to still thinner wings, so far as concerns a net gain in the thrust-available/thrust-required differential, will be compatible with both the minimum drag and the critical Mach speed criteria of such an airfoil system as that of Fig. 1, at least, for operation from intermediate to moderately high subsonic speeds. In other words, the increase in propulsive efficiency will exceed the attendant increase in minimum drag, for an appreciable range of greater wing thickness ratios.

Fig. 2 gives an illustrative exemplification of the many possible airplane design ramifications incorporating combinations of the several features of the invention, especially as disclosed in Fig. 1. It will likewise be apparent that the ducted jet airfoil organization of Fig. 3, may be incorporated in the aircraft configuration of Fig. 2.

Fig. 2 shows a half-plan view of a four-engine high performance airplane 151, incorporating turbofans 123a—123a compositely with a full span ducted-wing 66 similar to that of Fig. 1. It will be noted that split-diffusers 133—133 fan out obliquely in the horizontal plane to provide evenly balanced distribution of the secondary mixed turbofan flows discharging into wing duct 74, with relatively short length of duct served by any one diffuser segment. Duct 74 is of continuous spanwise extent and communicates with the eight diffuser outlets from the four turbofan powerplants. With this system, one or two engines may be cut out to increase range—the jet metering wedges being suitably adjusted therefor—without impairment of aerodynamic balance and with only a minor effect upon drag, due to the low internal velocities over any idle powerplant. In the design shown, it will be seen that ram air is supplied three ways, i.e. to primary compressors 118—118, to after-blowers 124—124 and to spanwise secondary jet 72 (which latter discharges tertiary flow, of course, in the case of turbofan rather than turbojet power).

It will be understood that the jet engine comprising the primary power source of the invention, whether of the conventional turbojet type, or the turbofan having the after-blower feature, or other pure jet powerplant types, will all be susceptible to throttle control of power output in accordance with customary practice, thus providing control over the magnitude of the forces developed by the integrated jet-wing system. The particular operating mechanisms for directing the fluid flow by means of the several vanes, flaps, metering wedges, etc., of the various forms of jet-propulsive airfoil systems, are common and well known in the art and need not be described or shown in detail at this point, since this invention primarily relates to fluid dynamic systems. Relative to these essential functions of the invention, suffice it to repeat that as these control surfaces are manipulated, the direction of the combustion and successively augmented slipstream and circulation mass flows will be changed. Thus the respective thrust and lift components thereof are mutually varied, from the static and low aircraft speed range in which maximum direct-lift is attained with merely residual thrust, if any, for take-off and landing, to the high speed range wherein such functions are progressively transposed with increasing speed, to provide the alternative extreme of substantially zero direct-lift effects, and optimum balance of augmented thrust with concurrent drag reduction.

Referring now to Fig. 3, there is disclosed an airfoil section 210 comprising a fixed and rigid structure to which at 211, a trailing edge flap 212 is controllably pivoted. The section 210 may be characterized as having a cellular type skin with multiple passages or ducts therein, and in the upper portion of the airfoil having an outer surface 213 containing a plurality of chordwisely spaced narrow bleeder slots or slits 214, which may be spanwisely respectively substantially continuous, or which may be comprised of spanwise series of aligned or misaligned short slits, according to structural necessities. The outer skin 213 at the entering edge 215 of the upper section, merges into the inner surface skin 216 extending chordwise in spaced relation to the outer skin 213, to termination in a lip at 217 internally near the rear end of the fixed section, to be further described. The spaced skins 213 and 216 define between them a passage or duct 218 into which incipiently turbulent boundary layers are drawn from the boundary layers moving relative to the upper skin 213, as they pass over the slits 214, as will be pointed out. At the rear of the fixed section at the top portion thereof, the passage 218 is sharply converged to an exit slot or augmentor discharge opening 220, by juxtaposition of the trailing edge curved segment 221 on the outer skin 213, having the slot defining surface 222. This surface is spaced from the lip 217 to form the slot exit 220 just described, and extends in convergent spaced relation to the upper surface 223, and the entering edge surface 224 of the trailing-edge-flap 212 to define a second slot discharge opening 219 in communication with slot 220. The airfoil has a lower portion of the fixed section comprising the outer skin or surface 225 provided with the suitably located BLC bleeder slits or slots 226, in areas of incipiently turbulent boundary layer flow. The disposition of the slots 226, as regards chordwise and spanwise spacing, if any of the latter, is in accordance with the same considerations as regards character of adjacent boundary layer flow, as determine the disposition of the upper slits 214. At the forward end lower surface 225 merges into the curved lower leading edge surface 227 leading into the internal skin 228, which preferably is continued to termination at the trailing edge of the fixed section in the closed surface 230 containing the hinge 211. The lower skins or surfaces 225 and 228 define a passage 231 which is in communication with the upper passage 218 through suitable means, such as by the hollow interconnecting structural element 232, or the like.

The space between the upper internal skin 216 and the lower internal skin 228 defines a stagnation slot characterized by the asymmetrical entrance passage 233 formed by the curved entering edge portions 215 and 227 converging to a throat at 234 from which the passage diverges inwardly without such acute angle as to cause flow separation, and leads into a pressure chamber 237, which leads into convergent slot 219.

As will be clear from applicant's earlier Patent No. 2,348,253, during flight, stagnation pressure energy is developed in chamber 237, after which its energy is rapidly converted into high velocity jet discharge through slot 219. This gives accelerated flow over the flap 212 and also reduces the pressure in the vicinity of slot 219, which assists laminar flow over the upper surface 213 and lower surfaces 225 of the airfoil section. Such stagnation pressure energy in flowing through the airfoil section and at accelerated velocity through the discharge slot 219 reduces the pressure at the discharge slot 220 from passages 218 and 231, and as this is less than that adjacent to surface slits or slots 214 and 226, the incipiently turbulent boundary layers flowing over surfaces 213 and 225 are drawn into passages 218 and 231 to discharge through discharge slots 220 and 219, with a consequent enhancement of laminar flow and the delay or obviation of transition. This is of high value as thus far described but the addition of thermal energy, as by the rearwardly directed jet propulsion discharge device 238, the nozzle of which is juxtaposed to the discharge slots 220 and 219, effects remarkable increases in efficiency, through augmentation of the jet mass flow by the addition of bleeder passage and stagnation slot flows, the former of which in particular concurrently effects a large reduction in drag over the airfoil. The accelerated stream of flowing gases discharged into the discharge slot 219 further augments the pressure differentials already described and simultaneously furnishes a jet propulsion discharge over flap 212 which, when the latter is deflected downwardly as indicated in dotted lines, greatly increased camber to enhance lift for take-off, and landing and other slow flight operations.

It will be understood that the principles of flow control set forth herein are applicable to other aerodynamic shapes, such as fuselages, nacelles, and the like, which may or may not fall within the strict definition of airfoil.

This application constitutes a continuation of application 234,582, filed June 30, 1951 (now abandoned), in which in turn was a continuation in part of application 531,637, filed April 18, 1944 (now abandoned), and the latter was a continuation in part of application eventuating in Patent 2,348,253 on an application Serial No. 405,083, filed Aug. 1, 1941.

I claim as my invention:

1. An integrated jet wing system including an airfoil comprising primary, secondary and tertiary internal flow means, said secondary means comprising a chordwise duct having an intake opening in the leading edge stagnation pressure region of said airfoil and diverging into a ram pressure chamber therein and rearwardly thereof leading into a convergent discharge slot generally in the trailing edge region of said airfoil, said primary means comprising a spanwisely-extending jet-propulsive conduit for transporting heated gas dynamic primary flow and disposed in said chamber to thermally energize secondary flow through said duct at relatively high-pressure and low-velocity thereof, said conduit having a rearwardly-directed nozzle through which said primary flow is discharged proximate to said slot to kinetically energize by ejector action said secondary flow under conditions of relatively low-pressure and high-velocity thereof and to form therewith a resultant mixed flow, said tertiary means comprising passage means establishing communication between an external surface of said airfoil and said mixed flow to withdraw by injector action external boundary layer tertiary flow and to effect common internal confluence of said primary, secondary and tertiary flows to form the ultimate combined flow blowing jet discharging from said slot, whereby said system is effective to provide boundary layer control, augmented jet propulsive thrust and coincidental circulation control direct-lift effects upon said airfoil.

2. A system as in claim 1, and movable trailing edge flap means for controlling the discharge direction of said combined flow to relatedly vary said thrust and lift effects.

3. A system as in claim 1, and adjustable means in said nozzle for controlling the ejector action effects on said secondary and tertiary flows.

4. A system as in claim 2, in which said flap means comprise spaced upper and lower elements defining a discharge passage effecting a functional guiding continuation of said slot.

5. A system as in claim 1, wherein said flap means has an upper surface the leading edge portion of which forms the lower surface of said slot.

6. A system as in claim 1, in which said passage means is in communication with two surfaces of said airfoil.

References Cited in the file of this patent

UNITED STATES PATENTS

| | | |
|---|---|---|
| 2,302,925 | Schlippe | Nov. 24, 1942 |
| 2,348,253 | Griswold | May 19, 1944 |
| 2,585,676 | Poisson-Quinton | Feb. 12, 1952 |